July 31, 1962 R. J. KARR 3,047,005
PRESSURE REGULATOR
Filed May 6, 1960 4 Sheets-Sheet 3
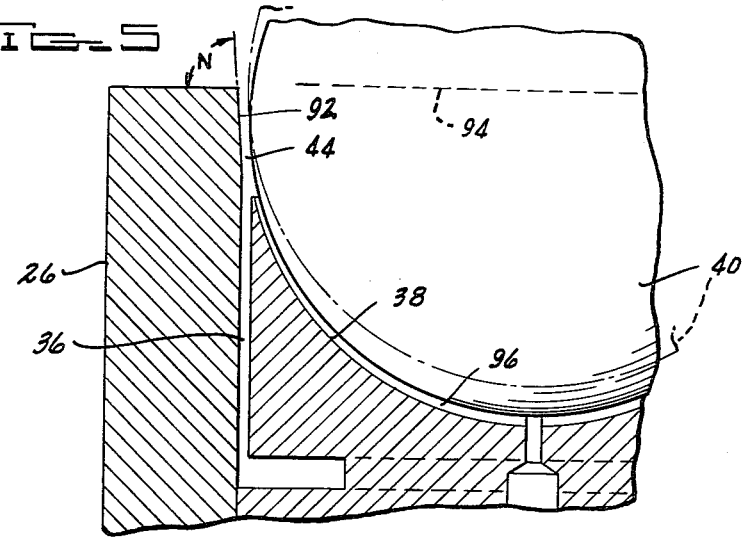
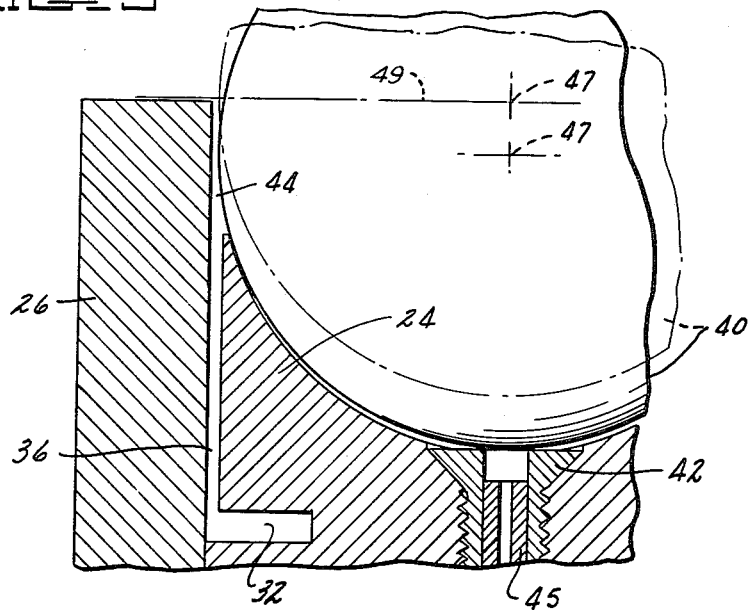
INVENTOR.
ROBERT J. KARR
BY
WILSON, LEWIS & McRAE
ATTORNEYS July 31, 1962  R. J. KARR  3,047,005
PRESSURE REGULATOR
Filed May 6, 1960  4 Sheets-Sheet 4
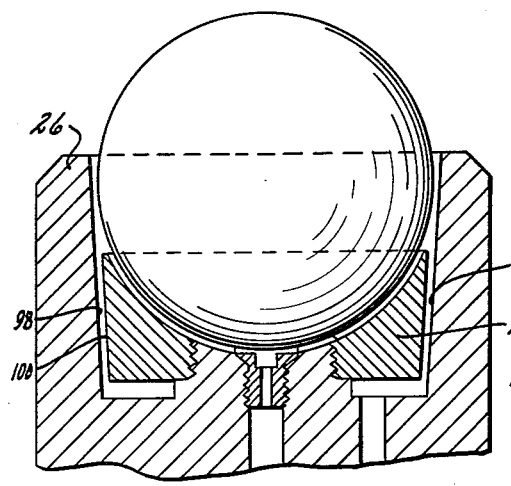
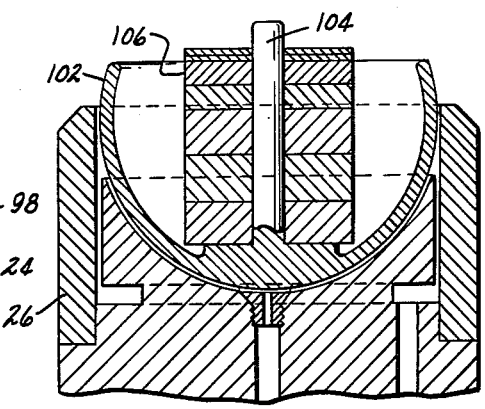
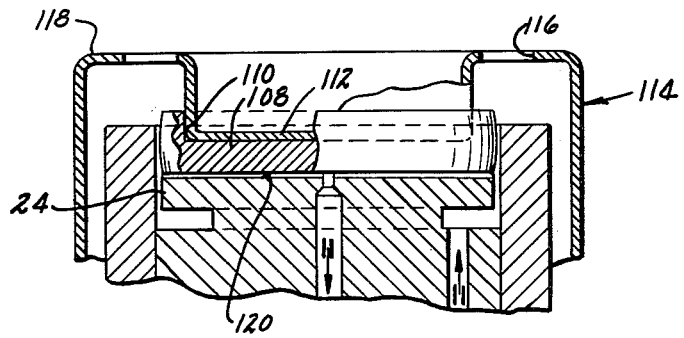
INVENTOR.
ROBERT J. KARR
BY
WILSON, LEWIS & McRAE
ATTORNEYS

United States Patent Office 3,047,005
Patented July 31, 1962

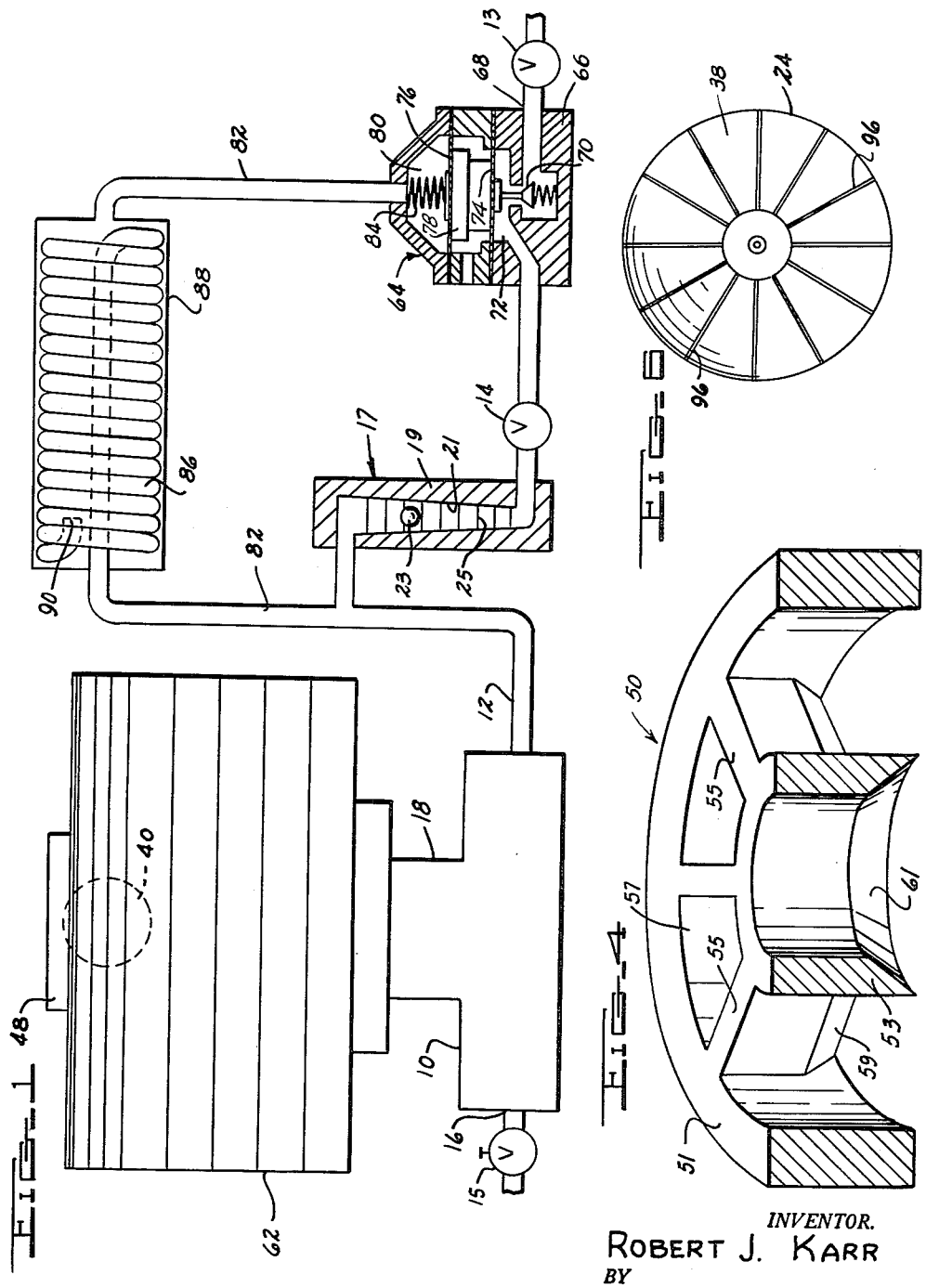

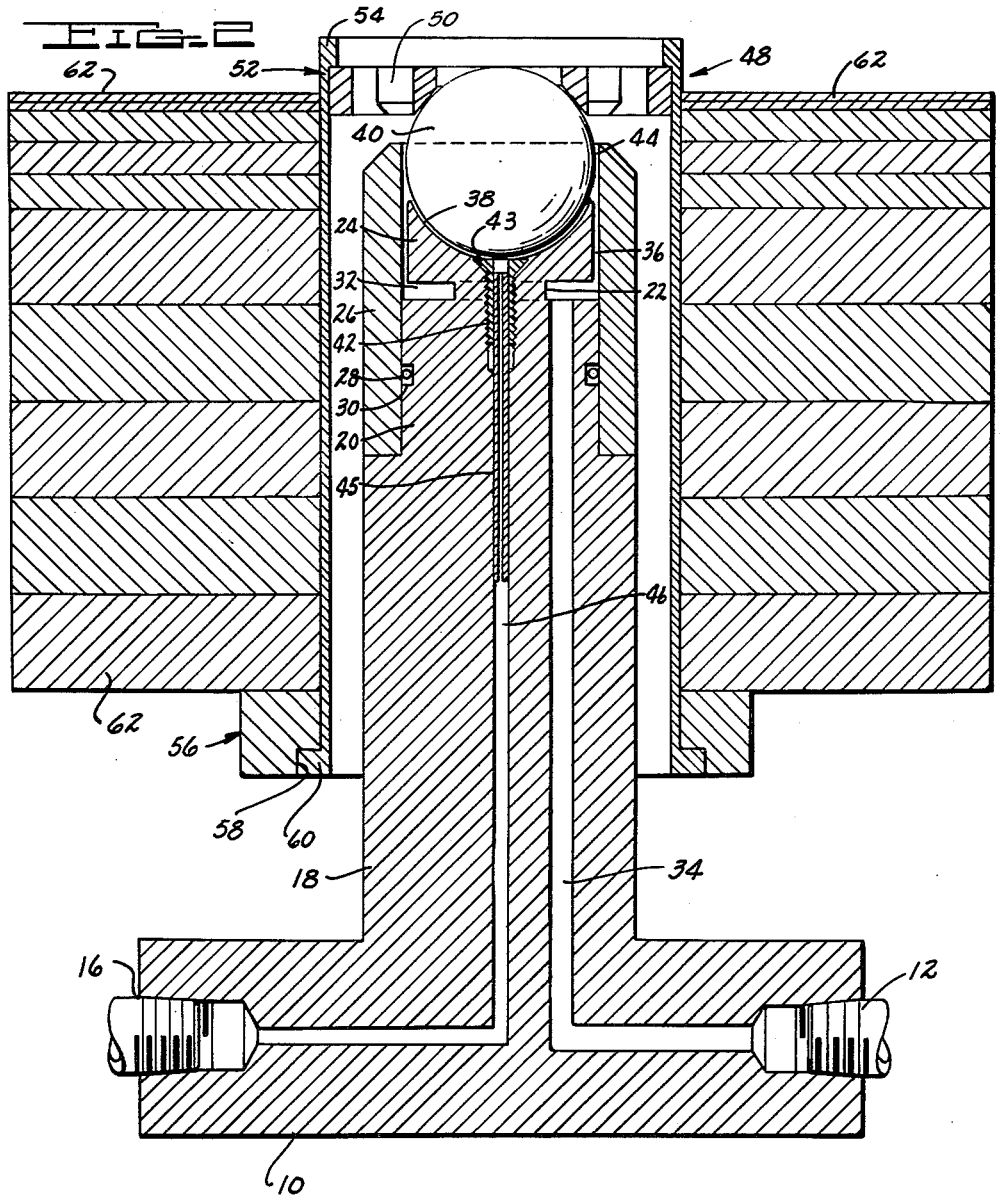

3,047,005
PRESSURE REGULATOR
Robert J. Karr, 1605 16th St., Wyandotte, Mich.
Filed May 6, 1960, Ser. No. 27,433
11 Claims. (Cl. 137—115)

The present invention relates to the method of, and apparatus for regulating fluid pressure, and particularly to a new and improved fluid pressure regulator that may be employed as a primary pressure standard for the simplified calibration of fluid pressure measuring devices, or for any purpose where an accurate regulation of pressure fluid is required.

This is a continuation-in-part of my application Serial No. 667,128, filed June 21, 1957, now abandoned.

Conventional methods of calibrating differential-pressure measuring devices, such as flow meters, utilize a water manometer. A water manometer and its associated equipment comprises a relatively awkward instrument and its use is tedious and entails considerable time. However, until the present invention there has not been a substitute calibrating device which provided satisfactory accuracy, was rugged and durable so as to be usable in the field, and the cost of which was low enough to make it commercially practicable.

The principles of the present invention are applicable in the design of apparatus for calibrating fluid pressure gages and for other devices or processes where pressures may be encountered within a range of 0.1 of an inch of water to pressures in the order of sixty pounds per square inch or even higher. It is to be understood that the disclosure herein is merely exemplary and that the limits of pressure referred to are not intended to limit the scope of the claims appended to this specification.

A principal object of this invention is to provide a substantially frictionless pressure regulating device in which hysteresis in a practical sense is non-existing and maximum reproducibility is possible.

Another object of this invention is to provide a method of regulating fluid pressure by introducing to a chamber beneath a weighted ball within a cylinder having an internal diameter slightly greater than that of the ball, a restricted supply of fluid, under pressure, at a volumetric rate such that it is sufficient to overcome leakage between the ball and the cylinder and thus create a back pressure sufficient to float the ball above a surface that communicates with the restricted supply.

Another object of the invention is to provide a pressure regulator in which a reasonable amount of variation in supply fluid has substantially no effect on the accuracy of pressure regulation.

Another object of the invention is to provide a frictionless dead weight tester embodying the principles of the new and improved pressure regulating apparatus.

One aspect of the invention may include a calibrated weight holder for supporting additional calibrated weights and in which the weight holder may include a ball or spherical portion adapted to be received within a recess provided within a cylindrical nozzle. The recess is terminated within the nozzle by a core having a seating surface for the ball on which grooves or serrations may be provided to permit the introduction of fluid therebetween. The nozzle or cylinder has an inside diameter slightly larger than the core diameter. A restriction and a thin annular passage are provided between the nozzle and core through which supply fluid may pass in its travel to an outlet leading from the core surface. The nozzle extends slightly above the geometric center of the ball portion when the latter is seated, and a very slight clearance is provided between the inner walls of the nozzle and the ball portion. The bottom of the core is connected to a device being calibrated, measured, or otherwise employed so that supply fluid under a pressure equal to that necessary to float the ball will register on the device being calibrated, or be supplied to the apparatus or process operating under the influence of the regulated pressure fluid.

In order to maintain the ball at an optimum height above the core surface regardless of the flow of fluid being delivered, a differential pressure flow regulator may be employed. It may comprise a ratio relay followed by a restriction and include a feedback to the relay.

Another aspect of the invention may include an outwardly flaring extension to the nozzle above the geometric center of the ball portion when at rest, and this portion may be designed to throttle the air escaping to atmosphere past the ball portion thereby to control the rate of exhaust beyond that effected by the ball portion itself.

Other objects of this invention will appear in the following description and appended claims, reference being had to the accompanying drawings forming a part of this specification wherein like reference characters designate corresponding parts in the several views.

In the drawings:

FIG. 1 is a diagrammatic view of a fluid pressure regulator system to which the principles of the invention have been applied;

FIG. 2 is a side elevational view in section of one embodiment of the apparatus of the present invention;

FIG. 3 is an enlarged view of the ball and nozzle portion of the FIG. 2 embodiment;

FIG. 4 is a perspective view of the upper portion of the weight carrier;

FIG. 5 is a view similar to FIG. 3 showing a second embodiment of the nozzle in which the walls are flared outwardly above the geometric center of the ball;

FIG. 6 is a top plan view of the core of the FIG. 5 apparatus showing the grooves provided therein;

FIG. 7 is another embodiment of the ball and nozzle in which the walls of the nozzle are tapered to a point beneath the geometric center of the ball;

FIG. 8 is another embodiment of the ball and nozzle portion in which the ball is hollow and weights are removably mounted in the interior thereof; and FIG. 9 is another embodiment of the nozzle portion in which only a segment of ball is utilized.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to the drawings, and particularly to FIGS. 1 and 2, the principles of the invention are shown as applied to a fluid pressure regulator including a base 10 having a supply inlet 12 adapted to be connected to a source of fluid under pressure through a manually adjustable restriction 14, which may be a needle valve. The base 10 also includes an outlet passage 16 that may be connected to any type of liquid or gas-operated pressure gage or the like which is required to be calibrated or it may be directed to any apparatus or process wherein accurately regulated fluid under pressure is required. On-off valves 13, 15 are provided at the inlet and outlet respectively.

A conventional rotameter 17 may be provided between the restriction 14 and inlet 12 to indicate the amount of air that is flowing. It is desirable to set the restriction 14 for the optimum flow which will result in the greatest accuracy of the pressure regulator. Adjustment of restriction 14 is a semi-permanent adjustment, and will require readjustment only if, for example, the restriction becomes partially plugged. The rotameter comprises a casing 19 having a conical passage 21 through which all of the air flows. A ball 23 is provided in passage 21 to rise a distance in accordance with the air velocity. Graduation marks 25 and the ball are visible through the casing 19 and indicate the amount of air flowing. The proper flow may be obtained by manipulation of restriction 14.

A standard 18 forming an integral part of base 10 may include a stepped portion 20, a necked portion 22 and a core portion 24. The stepped portion 20 receives a nozzle member 26 forming a slip fit therewith and extending upwardly to a point above the extremity of the core 24. An O-ring 28 is located in a groove 30 to provide a seal between the nozzle 26 and portion 20. The necked portion 22 forms with the nozzle member 26 and the core 24, a fluid distributing annular chamber 32 from which a duct 34 leads that is in communication with the inlet passage 12.

The diameter of the core is slightly less than the inside diameter of the nozzle portion 26 thereby forming an annular passage or restriction 36 through which the fluid supplied from distributing chamber 32 must pass. The core is provided with a surface 38 that is slightly less than semispherical construction for receiving a freely movable weight which may take the shape of a ball member 40 therein. The ball member 40 may be solid, hollow, a partial ball in form, or any other shape so long as it includes a spherical portion adjacent to the nozzle. The construction and arrangement of the parts are such that when at rest, the centerline or geometric center of the ball 40 lies slightly below the top extremity, or minimum internal diameter of the nozzle member 26. A very slight clearance 44 exists between the ball 40 and the inner, upper extremity of the nozzle member 26. Leading from the surface 38, a duct 46 extends downwardly through the standard 18 and communicates with the outlet passage 16 that is connected to the instrument being calibrated, or leading to the apparatus or process requiring the pressure regulated fluid. The duct 46 is threaded to receive a hollow screw 42 having its head 43 extending slightly above the surface 38. The head 43 positions the ball 40 above the surface 38 to provide a fluid path beneath the ball at all times. Mounted in the screw 42 is a tubular member 45 which extends downwardly for a distance in the duct 46. The tube 45 forms an outlet restriction.

A weight carrier 48 is supported on the ball portion 40. The carrier comprises a spider 50 which rests on the ball, a sleeve 52 having an internal flange 54 which hangs on the outer periphery of the spider, and a ring 56 having a notch 58 which rests on flange 60 provided at the lower end of sleeve 52. It will be appreciated that these parts may be made integrally if desired. The ring 56 serves as a seat for supporting calibrated annular weights 62.

The specific construction of the spider 50 aids in the operation of the device. As will be noted in FIG. 4, the spider comprises an outer ring 51 and an inner ring 53, the rings being secured together by radial members 55. The openings 57 formed between members 55 permit unimpeded fluid flow from the nozzle 26. The lower ends of radial members 55 and inner ring 53 are formed into chisel points 59, 61 to reduce the tendency of the escaping fluid to lift the weight carrier and thus reduce the force which the carrier and its weights are intended to apply. Such a reduction in this applied force would impair the accuracy of the instrument.

A differential pressure flow regulator 64 is connected to the inlet line 12 ahead of the restriction 14. It includes a housing 66 having an inlet 68 and a valve 70 adapted to close off, or establish communication, between inlet 68 and a chamber 72 within the housing 66. The housing 66 is designed to enclose a pressure ratio relay including a diaphragm 74 to which valve 70 is connected, and a diaphragm 76 having a larger effective area than diaphragm 74. Both diaphragms are connected together by a spacer 78. A chamber 80 is provided above the diaphragm 76 and it is connected to a feedback line 82 leading from line 12 downstream from the restriction 14. A spring 84 within chamber 80 acts on diaphragm 76, spacer 78, diaphragm 74 and valve 70 to provide a starting pressure for the flow regulator tending to establish communication between chamber 72 and inlet 68. The chamber 72 of the flow regulator 64 is connected to the line 12. The regulator shown may be termed an "exponential differential pressure flow regulator" because the flow increases or decreases in proportion to the square root of the pressure in line 12. This results from the fact that opening and closing of the regulator valve 70 is dependent on the difference in area of diaphragms 74, 76.

With the apparatus shown in FIG. 1, and, for example, with no weights 62 on the holder 48 (there is a definite known weight to the ball 40 and holder 48), the restriction 14 is initially opened, passing fluid through it, line 12, duct 34, chamber 32, through annular passage 36 thence out passage 44 past ball 40. The supply air is seen to be provided at the peripherey of the ball 40 near the exhaust point, with the result that substantially all of the air under the ball 40 is essentially static. The positionment of the supply inlet 36 immediately adjacent the exhaust outlet 44 makes the device react very quickly to pressure change and throttling occurs with a minimum disturbance of the outlet fluid pressure. The purpose of this is to minimize the dynamic effect of the air supply and to provide an outlet pressure which is substantially dependent only upon the weight and effective cross-sectional area of the ball 40. As restriction 14 is further opened, increasing amounts of the fluid pass through the space beneath ball 40 and thence through duct 46 to line 16. Eventually, the pressure of the flowing fluid causes the ball 40 to rise from the surface 38. The restriction 14 is opened sufficiently to cause the ball 40 to rise to a throttling position. In the embodiment shown in FIGS. 2 and 3, this will occur when the geometric center of the ball 40 is slightly above the top of the nozzle 26. As shown in dotted lines in FIG. 3, the ball 40 rises until its center 47 rises to a height represented by line 49, which is slightly higher than the nozzle top. At this optimum height of ball 40, the effective area of the ball 40 on which the fluid acts will remain substantially constant with slight variations of the height of the geometric center of ball 40 above the top of the nozzle 26. The result is that the output pressure in line 16 remains substantially constant.

Regardless of the output pressure in line 16 caused by different weights 62 being applied to the holder 48, the variable flow regulator 64 maintains the ball 40 at this optimum height. For example, should the ball 40 descend slightly for any reason, such as increased weights 62 being applied to carrier 48, an increase in the pressure in duct 34 would ensue since the escape clearance past ball 40 would decrease, causing a pressure build-up in duct 34 that would feed back through line 82 and act on diaphragm 76 causing valve 70 to open wider to increase the flow of fluid past restriction 14 to duct 34. This would continue until ball 40 again rises to its optimum height. Conversely, should the ball 40 rise above this optimum height, the pressure in feedback line 82 falls causing valve 70 to move towards the closed position to close until ball 40 returns to its optimum height.

While a specific system for regulating the fluid pressure of the input fluid supply has been shown, it is to be understood that this method has been shown for purposes of illustration since there are other means by which the input fluid supply could be regulated.

The force exerted by the combined ball member 40, carrier 48 and weights 62 in pounds per square inch is equal to the ratio of their combined weight to the effective area of the ball 40. Since, as previously explained, the effective area of the ball 40 is known and is substantially constant, and the weight of the ball 40 and carrier 48 are constant, it is only necessary to place weight 62 of the correct value which combine with the weight of the ball 40 and carrier 48 to produce the desired pressure in outlet line 16.

The apparatus described may have a self-generating, self-sustaining oscillatory action that may tend to produce hunting of the outlet pressure within line 16. In order to avoid this action, certain damping elements are employed. One of the most important damping elements is a coil 86 mounted in a tank 88. The coil 86 is actually an extension of the feedback line 82. As will be noted, the end 90 of the coil empties into one end of the tank. The other end of the tank is in turn connected to the portion of feedback line 82 in communication with chamber 80 of regulator 64. The coil and tank function to cause a time delay before pressure variations at the tester are transmitted to the chamber 80. This causes the regulator to be out of phase with the tester and, consequently, to anticipate the needs of the tester. For example, without the use of a tank and coil, the feedback line would cause the regulator to reduce the input pressure when the ball rises. However, the opposite should occur because by the time the pressure is decreased, the ball will be falling. At such time, an increase in pressure is desired in order to absorb the momentum of the ball and dampen its oscillation. The tank and coil arrangement will give this desired out of phase reaction. The actual length of the coil is important. The optimum coil length may be determined empirically for each application. In one model, it was found that the coil tubing should be about 12½ feet long.

In addition to the tank and coil the restriction 45 provided in the outlet from the space beneath ball 40 and the restriction 36 at the inlet are also important features in achieving dynamic stability of the device.

While the normal spacing of the annular opening 44 and the transverse dimension of the annular passage 36 may vary for the design of testers for different fluids, in an apparatus designed to use air as an operating medium, the opening 44, when ball 40 is resting on surface 38, may be in the order of about .0002 of an inch, and the passage 36 in the order of about .003 of an inch.

Referring to the modified form of the invention shown in FIG. 5, the nozzle member 26 is provided with an angularly diverging surface 92. The angle N of the surface 92 with the horizontal will depend upon design features and dimensional values. In a tester designed to calibrate pressure gages, it has been found that the angle N may be between 88° and 89½° with a clearance 44 in the neighborhood of .0002 of an inch and a space 36 of about .003 of an inch. Of course, variations in these dimensions can be effected for different test conditions.

In the FIG. 5 modification, which is a preferred embodiment of the invention, the center of the freely movable weight 40 never rises above the top of the nozzle since throttling occurs before it reaches that point. For example, as shown in dotted lines in FIG. 5, the ball has risen to a height, shown as line 94, to give the desired throttling. It will be noted that line 94 is below the top of the nozzle. This makes the FIG. 5 embodiment inherently more accurate over a nozzle not having an outwardly flared portion because when the weight 40 rises, its effective cross-sectional area will not be materially affected.

A modification of the surface 38 is shown in FIGS. 5 and 6. As will be noted, the hollow screw 42 has been omitted. Radially extending serrations or grooves 96 have been provided in surface 38 instead to maintain the ball 40 above the surface when the ball is at rest. The grooves 96 provide fluid paths for the initial build-up of pressure beneath the ball.

Similar results emanating from the structure of FIG. 5 can be achieved with the modified structure of FIG. 7, wherein the nozzle 26 is provided with walls 98, which diverge from a point beneath the core 24. It will be noted that the core walls 100 also have a mating divergence. In this construction, the throttling begins as soon as the ball starts to rise.

The structure shown in FIG. 8 includes a hollow movable weight 102 having the top portion cut away to permit access to the interior thereof.

An upstanding rod 104 is provided within the weight 102 to receive the removable weights 106. The opening into the weight 102 and the space around the weights 106 provide sufficient room for the insertion of a hand to remove or place the weights on the rod 104. The weight of member 102, even with the weights 106 in place, is relatively low. The embodiment is consequently adapted to low pressure work.

The FIG. 9 embodiment shows still another form the movable weight may take. In this embodiment, the weight is provided as a segment 108 of a sphere taken through the center of the sphere. The upper surface of the segment is provided with a recess 110 to receive a cup shaped projection 112 of the weight carrier 114. Openings 116 are provided in the top wall 118 of the carrier to permit escaping fluid to pass thereby. It will be noted that the upper surface 120 of the core 24 has been flattened to mate with the undersurface of the segment 108 as in the previous embodiments.

While the shape of the movable weight may be altered in many respects as shown in the various embodiments, there must always be a spherical portion adjacent the inner walls of the nozzle. The reasons for using a spherical surface are that the movable member will be self-aligning in the nozzle, that a minimum amount of the weight's surface is in close proximity to the nozzle walls which produces the possibility of foreign matter contained in the fluid causing the movable member to stick or jam, and the spherical surface results in a minimum amount of area of the movable member being in contact with the relatively high velocity escaping fluid and thus the flow effects on the movable member are minimized.

Having thus described my invention, I claim:

1. A pressure regulating device comprising means defining a cavity with an upwardly facing mouth; a movable member of predetermined weight located for free vertical movement in said cavity; said movable member having a spherical portion adjacent the interior walls of the cavity; the bottom wall of the cavity extending nearly to the interior walls of the cavity to define an annular inlet; means for introducing inlet pressure fluid into said cavity through said annular inlet sufficient to float said movable member above the bottom surface of the cavity; said movable member adapted to cooperate with the mouth of the cavity to form a variably restricted annular passage for the escape of fluid pressure from the cavity, the degree of restriction being increased by downward movement of the movable member and reduced by upward movement thereof; and an outlet leading from the bottom surface of the cavity beneath the movable member, whereby a varying inlet fluid pressure will result in a substantially uniform pressure of a predetermined value in said outlet.

2. A device as claimed in claim 1 and further characterized in that the movable weight is a sphere.

3. A device as claimed in claim 1 and further characterized in that the movable weight is a segment of a sphere.

4. A device as claimed in claim 1 and further characterized in the provision of detachable weights for securement to the movable weight to thereby vary its effective weight.

5. A device as claimed in claim 1 and further characterized in that the movable weight is a hollow sphere; an opening in the sphere; means within the sphere for the securement of a plurality of detachable weights; and a plurality of weights positionable in the sphere through said opening and securable on said means to vary the effective weight of the sphere.

6. A device as claimed in claim 1 and further characterized in the provision of means in said fluid outlet conduit for dampening oscillations of the movable weight.

7. A pressure regulating device comprising a substantially vertical nozzle having the upper end open; the inner wall of said nozzle adjacent the upper end thereof flaring outwardly; a member within the nozzle beneath the upper end extending to a point near the inner wall of the nozzle to form a recess in the upper portion of the nozzle; fluid outlet means leading from the upper surface of said member; fluid inlet means in fluid communication with the space between said member and the inner wall of the nozzle positioned to supply an upward flow of fluid under pressure; a freely movable weight, positioned to be supported by said fluid pressure, receivable in the recess and forming a piston fit with the inner walls of the nozzle however, providing a slight clearance therebetween; a spherical peripheral portion extending entirely around the weight and forming the largest horizontal diameter thereof; said spherical portion being positioned intermediate the upper surface of said member and the upper end of the nozzle and adapted to cooperate with the upper portion of the nozzle to form a variable exhaust restriction whereby to provide a substantially uniform pressure of a predetermined value in the outlet means directly proportional to its weight and horizontal cross-sectional area.

8. A device as claimed in claim 7 and further characterized in that the inner nozzle walls begin to diverge outwardly from a point beneath the upper surface of said member.

9. A pressure regulating device comprising means defining a cavity with an upwardly facing mouth; a movable member of predetermined weight located for free vertical movement in said cavity; said movable member having a spherical portion adjacent the interior walls of the cavity; means for introducing inlet pressure fluid into said cavity sufficient to float said movable member above the bottom wall of the cavity; said movable member adapted to cooperate with the mouth of the cavity to form a variably restricted annular passage for the escape of fluid pressure from the cavity, the degree of restriction being increased by downward movement of the movable member and reduced by upward movement thereof; and an outlet leading from the bottom surface of the cavity beneath the movable member, whereby a varying inlet fluid pressure will result in a substantially uniform pressure of a predetermined value in said outlet.

10. A pressure regulating device comprising a seat; a freely movable weight positioned above said seat; a substantially vertical housing surrounding said seat and weight; said weight having a circumferentially extending spherical portion adjacent the interior walls of the housing; means for introducing inlet fluid under pressure beneath and near the point of adjacency of the spherical portion and the interior walls of the housing; the spherical portion of said weight positioned to cooperate with said housing to define a variable cross-section discharge flow path leading out of the upper end of the housing; the cross-section of said discharge flow path increasing with slight upward movement of the weight and decreasing with slight downward movement of the weight; and outlet means leading from said seat.

11. A device as claimed in claim 10 and further characterized in the provision of means for regulating the volumetric flow of said inlet fluid in response to the flow of fluid through the variable cross-section discharge flow path; said regulating means including control means for dampening oscillations of the movable weight.

References Cited in the file of this patent

UNITED STATES PATENTS

| 67,538 | Harrison | Aug. 6, 1867 |
| 854,393 | Wirt | May 31, 1907 |
| 1,495,774 | Brown | Mar. 27, 1924 |
| 1,883,190 | Welcker | Oct. 18, 1932 |
| 2,258,758 | Haultain | Oct. 14, 1941 |
| 2,438,973 | Johnson | Apr. 6, 1948 |
| 2,676,782 | Bostock et al. | Apr. 27, 1954 |
| 2,739,607 | Murray | Mar. 27, 1956 |

FOREIGN PATENTS

| 1,878 | Great Britain | Jan. 3, 1878 |